(12) United States Patent
Dahl

(10) Patent No.: US 9,171,449 B2
(45) Date of Patent: Oct. 27, 2015

(54) METHOD AND SYSTEM FOR SENDING AN ALARM

(75) Inventor: Per Dahl, Gyttorp (SE)

(73) Assignee: SOFTALARM AB, Orebro (SE)

( * ) Notice: Subject to any disclaimer, the term of this patent is extended or adjusted under 35 U.S.C. 154(b) by 124 days.

(21) Appl. No.: 13/884,700

(22) PCT Filed: Nov. 10, 2011

(86) PCT No.: PCT/EP2011/069827
§ 371 (c)(1),
(2), (4) Date: Jul. 1, 2013

(87) PCT Pub. No.: WO2012/062849
PCT Pub. Date: May 18, 2012

(65) Prior Publication Data
US 2014/0152453 A1 Jun. 5, 2014

(30) Foreign Application Priority Data
Nov. 12, 2010 (EP) .................................... 10191032

(51) Int. Cl.
| | |
|---|---|
| *G08B 29/00* | (2006.01) |
| *G08B 25/10* | (2006.01) |
| *G08B 25/00* | (2006.01) |
| *G08B 25/01* | (2006.01) |
| *H04W 4/22* | (2009.01) |
| *H04W 76/00* | (2009.01) |

(52) U.S. Cl.
CPC .............. *G08B 25/10* (2013.01); *G08B 25/005* (2013.01); *G08B 25/009* (2013.01); *G08B 25/016* (2013.01); *H04W 4/22* (2013.01); *H04W 76/007* (2013.01)

(58) Field of Classification Search
None
See application file for complete search history.

(56) References Cited

U.S. PATENT DOCUMENTS

| | | | | |
|---|---|---|---|---|
| 6,028,514 | A * | 2/2000 | Lemelson et al. | ........ 340/539.13 |
| 7,629,884 | B2 * | 12/2009 | Cameron et al. | ......... 340/539.18 |
| 8,742,924 | B2 * | 6/2014 | Eisenman | ................ 340/539.13 |
| 8,923,799 | B2 * | 12/2014 | Cordero | ..................... 455/404.1 |
| 2006/0202819 | A1 | 9/2006 | Adamczyk et al. | |
| 2009/0243878 | A1 | 10/2009 | Ricordi et al. | |

FOREIGN PATENT DOCUMENTS

| | | |
|---|---|---|
| CA | 2215440 A1 | 3/1999 |
| WO | 2004057901 A | 7/2004 |

OTHER PUBLICATIONS

PCT International Search Report mailed Dec. 1, 2011 for International Application No. PCT/EP2011/069827, filed Nov. 10, 2011 (3 pages).

* cited by examiner

*Primary Examiner* — Travis Hunnings
(74) *Attorney, Agent, or Firm* — Remarck Law Group PLC

(57) ABSTRACT

The present invention relates to a method for sending an alarm. The method comprises sending an alarm comprising alarm code from a first terminal unit to a second terminal unit, and further providing the alarm to a third terminal unit if the third terminal unit is located within a predetermined distance from the first terminal unit, wherein the second and third terminal units are determined by a first and second contact register associated with the first and second terminal units, respectively. Furthermore, the present invention further relates to a corresponding server, computer program product and system adapted for generating and sending an alarm to terminal units.

13 Claims, 3 Drawing Sheets

Communication between mobile devices for safety & security

METHOD AND SYSTEM FOR SENDING AN ALARM

CROSS-REFERENCE TO RELATED APPLICATIONS

This application is a 371 U.S. National Stage of International Application No. PCT/EP2011/069827, filed Nov. 10, 2011, which claims priority to EPC No. 10191032.1, filed Nov. 12, 2010. The disclosure of each of the above applications is incorporated herein by reference in their entirety.

FIELD OF THE INVENTION

The present invention relates to a method for generating and sending an alarm from a terminal unit to other terminal units. The present invention also relates to a corresponding server, computer program product and system adapted for generating and sending an alarm to terminal units.

BACKGROUND ART

There are many situations when an individual may need, or desire, to send an alarm in order to get immediate help or assistance. Also, an individual may want to notify or inform his/hers surrounding about location and present status in order mitigate risk and/or to enable fast response time if an emergency situation requiring assistance should occur.

For the above situations, various surveillance systems and alarm devices are known which allow a user to communicate or send an alarm to an alarm central, or a person, in order to receive assistance. Common devices includes mobile or wire phones or communication devices which automatically or manually transmits, via e.g. a communication network, a voice or text message containing information identifying an alarm situation.

For example, U.S. 2009/0181640 describes an interactive personal surveillance and security system for a user carrying a wireless communication device, wherein the portable communication device is capable of capturing and sending surveillance information, such as video, images, audio, etc. to a remotely located surveillance system.

However, the surveillance system described in U.S. 2009/018640 is complex and expensive and requires cumbersome preconfigured sets of instructions to process, analyze and transmit/receive alarm information. Also, the systems is disadvantageous in that the response time for relaying an alarm to relevant users is long which results in a slow and inefficient system. Hence, the system does not allow help or assistance to reach a user in need sufficiently fast.

Further attention is drawn to U.S. 2006/0202819, generally relating to a method and system for alerting a person to a situation, and particularly to a method and system for alerting a member of a contact list to an emergency situation. However, U.S. 2006202819 only provides limited improvements in allowing help or assistance to reach a user in need sufficiently fast Accordingly, there is desired to provide improvements to the above system for sending an alarm in order to enable more efficient, durable, and fail-safe assistance to a person in need. Thereby, for example the level of personal safety for users of the system may be increased.

SUMMARY OF THE INVENTION

In view of the above-mentioned, a general object of the present invention is to provide improvements when sending an alarm, providing increased efficiency in a durable and cost efficient manner.

According to an aspect of the invention, these and other objects are achieved through a method for sending an alarm, comprising the steps of generating an alarm code in a first terminal unit, the alarm code comprising at least coordinate information representative of a location of the first terminal unit; sending an alarm comprising the alarm code from the first terminal unit to a second terminal unit, which second terminal unit is determined by a first recipient related register (contact register) associated with the first terminal unit; and receiving the alarm in the second terminal unit. Furthermore, the alarm is provided to a third terminal unit for activating an alarm indication in the third terminal unit if the third terminal unit is located within a predetermined distance from the first terminal unit, wherein the third terminal unit is determined by a second recipient related register (contact register) associated with the second terminal unit.

Advantageously, the method provides for efficiently sending, and relaying, an alarm, or a notification, between terminal units, wherein the relay to different terminal units is determined by predetermined registers comprising information of known, predetermined recipients, such as the known friends and contacts of the users of the terminal units. For example, the alarm may be relayed to friends of friends, or contacts of contacts, which are considered trustworthy and suitable to provide help or assistance when needed. Hence, the alarm chain of trusted users to which the alarm is provided.

In more detail, an alarm may be sent from a first user to a second user being a known contact of the first user. Thereafter the alarm is provided to a third user which is specified in the contact register of the second user but only if the third user is located in a predetermined proximity to the first user.

By providing the alarm to a third terminal unit which is located within the predetermined distance from the first terminal unit, a reduction in communication traffic between terminal units may be provided since redundant, or unnecessary, network traffic between terminal units may be avoided. Also, the method provides for a reduction in processing related to e.g. analyzing and determining of the relaying of an alarm to suitable terminal units. Similarly, by only sending the alarm to terminal units which are determined from the recipient related registers associated with the first and second terminal units, a reduction in communication traffic may be realized since the alarm is not relayed via terminal units which are not intended to receive alarm information. In other words, the method provides an improved implementation of sending an alarm to and notifying only relevant and eligible users which are determined from the registers associated with each one of the terminal units, such that a relay chain of the alarm from the first to the second, and from the second to the third, terminal units is provided.

The method for sending an alarm may e.g. be utilized anytime a user experience an unexpected problem which automatically, or by the operation of the user, initiate an alarm to be provided to a trusted chain of contacts, wherein an alarm indication is initiated in the terminal units of the trusted contact at the end of the chain, if that trusted contact is located in sufficiently close proximity of the user initiating the alarm.

Accordingly, the method enables an exposed user to quickly get suitable help from reliable and relevant users, while utilizing an efficient amount of potential available network traffic and minimizing the level of required process steps for relaying the alarm.

In this context, it is pointed out that according to the principle of the method for sending an alarm, the alarm may be sent between terminal units in a node network which may be built up of pairs of users using terminal units, where the users in each pair of users may be knowing and/or trusting each other. The pairs of people are connected via the contact registers of the terminal units, which provide that an alarm may be sent to friends of friends, or to trusted users associated with a known trusted user.

In various embodiments of the method, the process of providing an alarm for activating an alarm indication in the third terminal unit may advantageously be realized using alternative solutions. For example, the determination of if the third terminal unit is located within the predetermined distance from the location of the first terminal unit may be performed locally by the third terminal unit after receipt of the alarm, wherein, in a next step, the results of the determination controls the activation of the alarm indication. Advantageously, the determination process comprises decentralized processing in node of the network of terminal units. Alternatively, the determination of if the third terminal unit is located within the predetermined distance may be performed prior to providing the alarm to the third terminal unit. In this case, the determination may e.g. be performed in a central server device, or in another terminal unit, such as the second terminal unit.

In addition, according to an exemplifying embodiment, the alarm may simultaneously, or substantially simultaneously, be sent to a plurality of second terminals each of which are operated by users being known contacts specified by the first users contact register. Subsequently the alarm may be further provided to a plurality of third terminal units each of which are operated by known users known by any one of the users of the plurality of second terminal units. Hence, the alarm may simultaneously be relayed to a plurality of users in a growing node like network structure based on contact registers and contacts' contact registers, and so on. According to a further embodiment, the alarm may be provided to a fourth terminal unit for activating an alarm indication in the fourth terminal unit if the fourth terminal unit is located within a predetermined distance from the first terminal unit, wherein the fourth terminal unit is determined by a third recipient related register associated with the third terminal unit. Hence, the alarm is advantageously relayed to a next level of users that are linked to the first user via e.g. the contacts registers associated with the second and third terminal units. In this manner, a network of relevant user may efficiently be utilized to relay the alarm according to the method in a robust and cost efficient manner to a high number of suitable recipients arranged in levels. Furthermore, features and measure of embodiments of the method for sending alarms may additionally and in similar manner be implemented with respect to the fourth terminal unit, and further terminal units, such as a fifth, sixth and seventh, etc., each being determined from contact register associated with a terminal unit forming a lower level node.

Furthermore, the predetermined distance may be based on a predetermined geographical region. Hence, the predetermined distance may advantageously vary in accordance with a predetermined geographical region, such a neighborhood, city or country region, or a region as determined based on communication networks zones and/or cell areas.

In an exemplifying embodiment of the present invention, the alarm code further comprises at least one alarm identification parameter. The alarm identification parameter enables the receiver of the alarm to acquire more information about the alarm, such as the type of alarm, e.g. low, medium or high alert importance, or information about the user sending the alarm. Advantageously, important information relating to the alarm may efficiently be provided to the users of the third terminal when receiving an alarm indication, which facilitate improved possibilities of reacting to the alarm. For example, the alarm identification parameter may be generated automatically by the first terminal unit, or in response to an input operation by the user of the first terminal unit. The alarm identification parameter may further include captured surveillance information, such as video, images, audio, or sensor data from e.g. acceleration, pitch, roll, gas, particle, health-monitoring sensors, etc. which may be contained in the alarm. Identification parameters, such as surveillance information, may further be continuously transmitted from the first terminal unit and provided to the third terminal units.

Furthermore, the step of providing the alarm to the third terminal unit may comprise sending the alarm from the second terminal unit, and receiving the alarm in the third terminal unit. Hence, the alarm is physically relayed via the second terminal unit. Alternatively, a server may centrally store recipient related registers associated with the respective terminal units, which registers may be periodically updated in the server device communication with the respective terminal units. The alarm may further be sent directly between the first and second terminal units, and/or between the second and third terminal units. In this manner, an alarm may be directly transmitted to the intended terminal unit. The alarm may also, according to an exemplifying embodiment, be sent via at least one remote server device, or controlling network node unit, which forwards, or relays, the alarm between the first and second terminal units, and/or between the second and third terminal units.

Preferably, the method comprises determining if the third terminal unit is located within the predetermined distance from the first terminal unit by comparing the coordinate information representative of the location of the first terminal unit with coordinate information representative of a location of the third terminal unit. In this manner, it is efficiently determined if the third terminal unit is located within the predetermined distance from the first terminal unit e.g. by utilizing the coordinate information encoded into the alarm code of the alarm which is sent according the method. Furthermore, coordinate information may be compared with further coordinate information representative of geographical regions, such as a plurality of a geographical coordinate points mapping, or defining, a geographical region.

The method may further comprise generating a reply code in the third terminal unit, wherein the reply code comprises at least some coordinate information representative of a location of the third terminal unit; and providing a reply comprising the reply code to the first terminal unit. Advantageously, the replay may notify the first terminal unit and the user of the first terminal unit that the alarm has been acknowledged or responded to by a user. Furthermore, the replay code contains coordinate information which provide the first terminal unit with information about where help from the user of the third terminal unit is located. Accordingly, the method efficiently enables to a user to send an alarm and receive a reply confirmation and indication of where within the predetermined distance assistance is located. For example, a reply message may be generated and sent from the third terminal unit by its user by pressing of an accept command on the third terminal unit. Also, this enables a method for sending an alarm wherein the user sending the alarm may be noticed that the alarm is taken care of and who has taken care of the alarm.

Additionally, the alarm may according to an embodiment be provided to the third terminal unit for activating an alarm indication after a predetermined time period from the sending of the alarm from the first terminal unit. Hence, the method further comprises a time parameter implemented into the relaying of the alarm which provides escalation of the alarm to further users after predetermined time period.

It may also be possible to determine if the second terminal unit is located within a second predetermined distance from the terminal unit. Hence, the relaying of an alarm to e.g. a level 1 user operating the second terminal unit may be efficiently restricted to second terminal units which are located close to the first terminal units. Furthermore, the alarm may efficiently be relayed only to third terminal units which are determined by the contact register of second terminal units which are close to the first terminal unit. Accordingly, the relaying of the alarm is increasingly restricted to user in the proximity of the first terminal unit based on the location of the first terminal unit.

According to another aspect of the present invention, there is provided a server configured to provide an alarm, wherein the server is configured to acquire an alarm code generated in a first terminal unit, the alarm code comprising at least coordinate information representative of a location of the first terminal unit, provide the alarm comprising the alarm code to a second terminal unit, which second terminal unit is determined by a first recipient related register associated with the first terminal unit, forward the alarm to a third terminal unit for activating an alarm indication in the third terminal unit if the third terminal unit is located within a predetermined distance from the first terminal unit, the third terminal unit being determined by a second recipient related register associated with the second terminal unit. This aspect provides similar advantages as discussed above.

According to still another aspect, there is provided a computer program product comprising a computer readable medium having stored thereon computer program means for causing a server to provide an alarm, wherein the computer program product comprises code for acquiring an alarm code generated in a first terminal unit, the alarm code comprising at least coordinate information representative of a location of the first terminal unit, code for providing an alarm comprising the alarm code to a second terminal unit, which second terminal unit is determined by a first recipient related register associated with the first terminal unit, code for forwarding the alarm to a third terminal unit for activating an alarm indication in the third terminal unit if the third terminal unit is located within a predetermined distance from the first terminal unit, the third terminal unit being determined by a second recipient related register associated with the second terminal unit. Also this aspect provides similar advantages as discussed above. the computer readable medium may be one of a removable nonvolatile random access memory, a hard disk drive, a floppy disk, a CD-ROM, a DVD-ROM, a USB memory, an SD memory card, or a similar computer readable medium known in the art.

According to a still further aspect of the present invention, there is provided a system for sending an alarm, wherein the system comprises a first terminal unit adapted to generate an alarm code comprising at least coordinate information representative of a location of the first terminal unit, wherein the first terminal unit is further adapted to provide an alarm comprising the alarm code to a second terminal unit adapted to receive the alarm, which second terminal unit is determined by a register representative of recipient related information associated with the first terminal unit. Furthermore, the second terminal unit is adapted to provide the alarm to a third terminal for activating an alarm indication in the third terminal unit, if the third terminal unit is located within a predetermined distance from the first terminal unit, wherein the third terminal unit is determined by a second recipient related register associated with the second terminal unit.

With reference to the above described method for sending an alarm, the system for sending an alarm is advantageous in similar manners and allows for an improved relying of an alarm.

According to an exemplifying embodiment, the third terminal unit is adapted to generate reply code comprising coordinate information representative of a location of the third terminal unit, and the third terminal unit is further adapted to provide a reply comprising the reply code to the first terminal unit.

According to an exemplifying embodiment, the third terminal unit is adapted to provide the alarm to a fourth terminal for activating an alarm indication in the fourth terminal unit, if the fourth terminal unit is located within a predetermined distance from the first terminal unit, wherein the fourth terminal unit is determined by a third recipient related register associated with the third terminal unit.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing at least one example embodiment of the invention, wherein.

DETAILED DESCRIPTION OF EMBODIMENTS OF THE INVENTION

Figure 1:
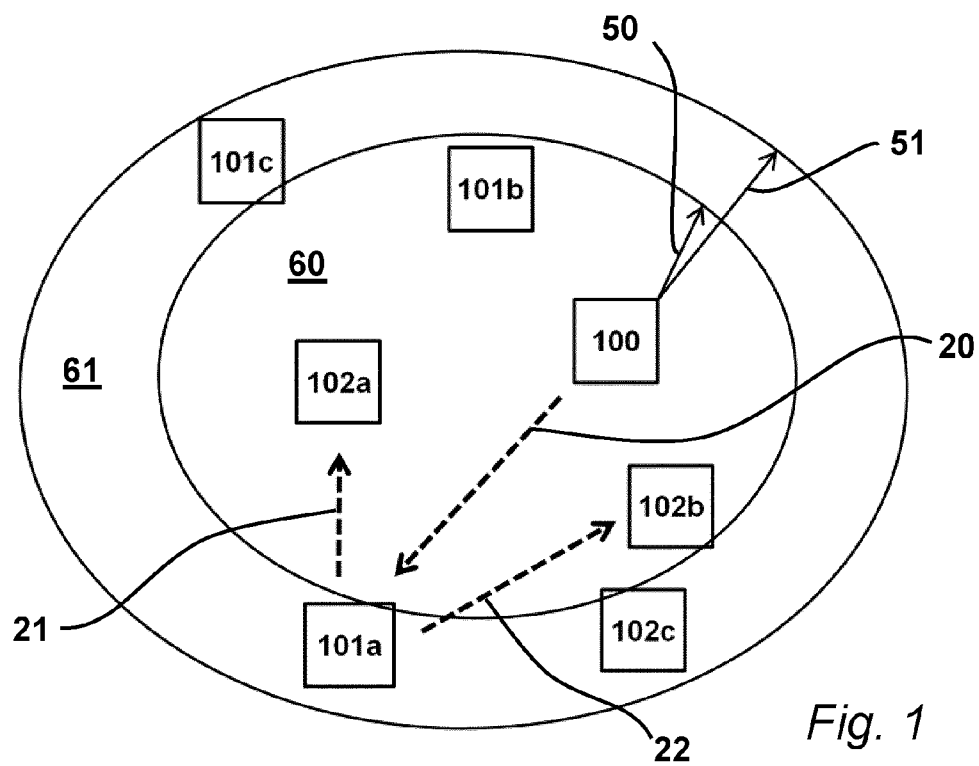
FIG. 1 is a schematic illustration of a plurality of users of terminal units with different geographical locations, wherein a first user may send an alarm which is provided to a third terminal unit according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 4:
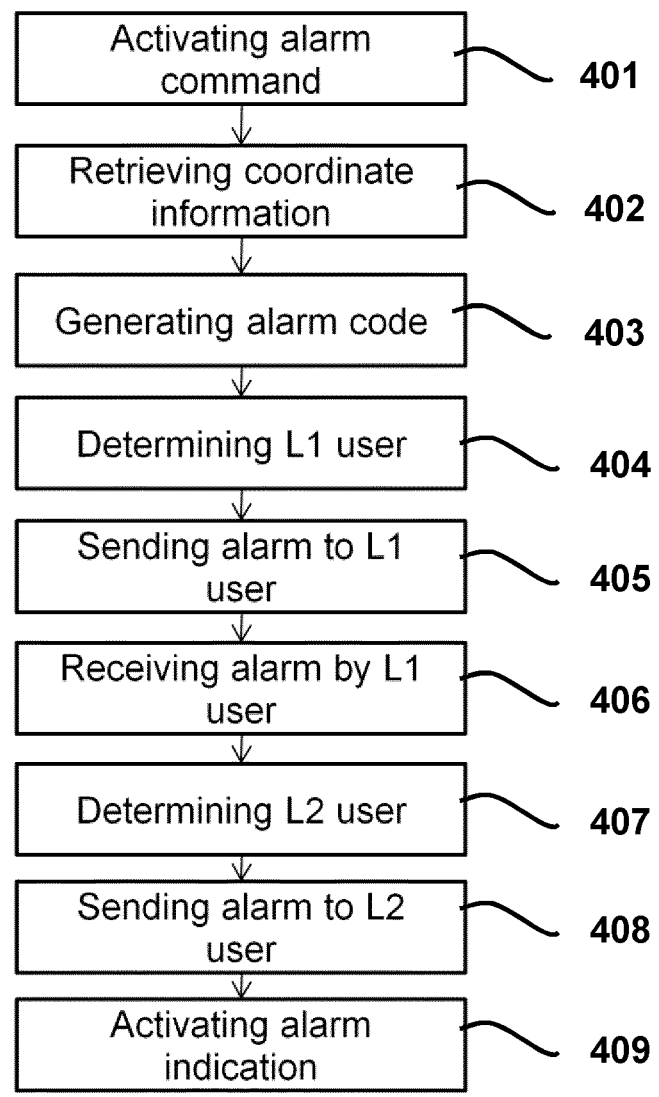
FIG. 4 is a flow chart schematically illustrating an embodiment of the method according to the present invention.

Referring now to the drawings and to FIGS. 1 and 4 in particular, there is depicted a schematic illustration of a plurality of users located on different geographical distances from each other is shown and a flow chart of how the system is operated. Each user has a terminal unit which is associated to and controlled by the specific user. The terminal unit may for example be comprised of different types of user equipment such a wireless communication devices, stationary terminal units, smart phones, portable computer, etc. or any other suitable device that may be capable of receiving, transmitting and relaying an alarm or notification message.

A first user 100 operating a first terminal unit may in a situation automatically, or manually, by e.g. activating, in step 401, an alarm command on the first terminal unit. Coordinate information representative of the location of the first terminal unit will be retrieved, in step 402, from a location providing source. An alarm comprising an alarm code will be generated, in step 403, by the first terminal unit and sent, in step 405, to a level 1 (L1) user 101a operating a second terminal unit, as indicated by dotted arrow 20. Prior to sending the alarm, the L1 user 101a is determined, in step 404, by retrieving information from the contact register associated with the first user 100. In other words, the terminal unit will send the alarm to at least one L1 user 101a. As illustrated, there may be a plurality of different L1 users 101b, 101c available. Hence, the alarm may be send to a plurality of the different L1 users which are registered in the contact register associated with the first user 100. In a next step 406, the alarm is received, in this case, by the L1 user 101a. Furthermore, a level 2 (L2) user is determined, in step 407, after which the alarm is sent to, in step 408, the level 2 (L2) user 102a, as indicated by dotted arrow 21, who is operating a third terminal unit. If the L2 user 102a is located within a first predetermined distance 50, or a first geographical region 60, based the location of the first user 100, an alarm indication will be activated, in step 409, in the third terminal unit. In other words, the L2 user 102a will only receive an alarm which generates an alarm notification, if the L2 user 102 is located within the proximity of first user 100, as determined by the predetermined distance 50, or geographical region 60.

For example, the first predetermined distance 50 may be determined by the first user 100 in the first terminal unit, wherein a parameter value for the predetermined distance 50 is encoded into the alarm code in the form an alarm identification parameter which may be retrieved and processed by the surrounding terminal units which are relaying and/or receiving the alarm.

As illustrated, the alarm may be provided to at least one L2 user 102a, but there may be an additional L2 users available, such as user 102b, which may be registered in the contact register associated with the L1 user 101a and may therefore also receive an alarm as indicated by dotted arrow 22. Hence, for each level of users, such as L1 users and L2 users, the number of potential users which the alarm may be provided to increases. However, the L2 user 102c may be registered in the contact register associated with the L1 user 101a, but is located too far away from the first user 100 which means that the an alarm and/or and alarm indication will not be provided in the terminal unit operated by the L2 user 102c. In more detail, an alarm will not be provided to L2 user 102c since that user is located outside the predetermined geographical region 60.

As further illustrated, a second predetermined distance 51 defining a second geographical region 61, based on the location of the first user 100 may be used for determining if a L1 user should be able to receive the alarm. In other word, the second predetermined distance 51 may advantageously be implemented in the method in order to restrict the relaying of the alarm such that it is only is relayed to nearby L1 users. Furthermore, each level of users may be associated with a predetermined distance determining the effective range, or distance, from the first user for receiving an alarm for that specific user level. Typically, a different predetermined distances associated with different level of users may be larger or smaller than the foregoing or following user levels.

According to an example, as illustrated in FIG. 1, the predetermined distance 50, or the first geographical region 60, associated with the L2 users is smaller than the second predetermined distance 51, or geographical region 61, associated with the L1 users.

Each terminal unit, for example the ones used by L1 user, may be further controlled by a variable parameter which controls if the second predetermined distance 51 should be used or not. In other words, a terminal units of an L1 user may be configured to operate in a location dynamic mode which means that the alarm while only be received by the terminal unit if the terminal unit is located within the second predetermined distance 52. Alternatively, a terminal unit of an L1 user may be configured to operate in a static mode which means that the alarm will be sent and received to the terminal unit impendent of the location of the terminal unit in relation to location the terminal unit of the first user 100 sending the alarm.

Furthermore, the method system may advantageously be operated with users which are connected to each other in any number of user levels.

Figure 2:
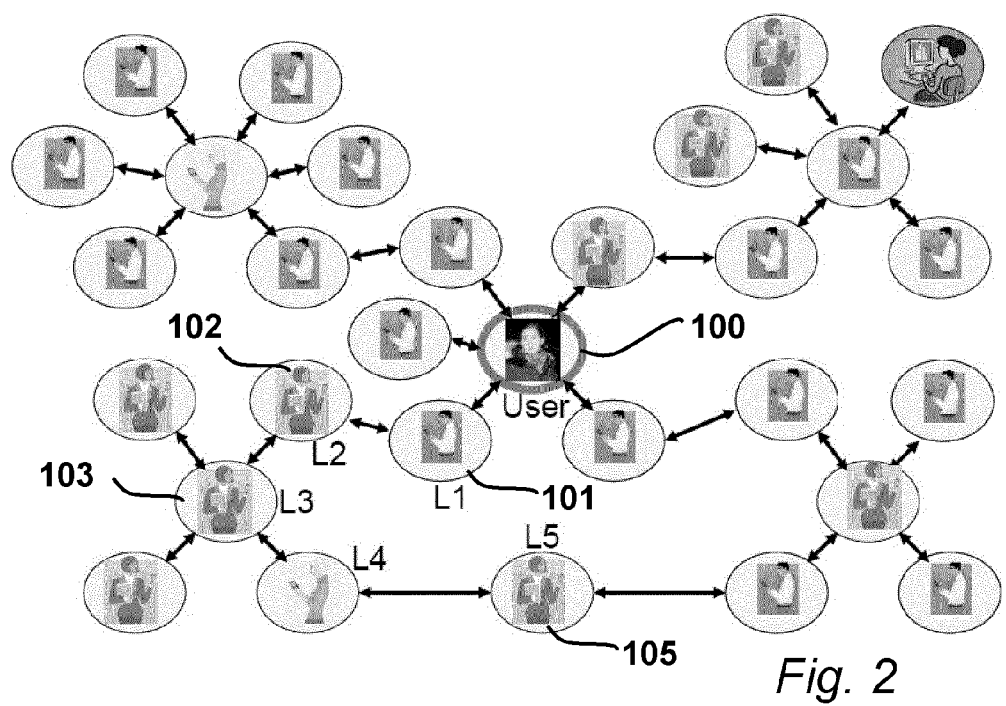
FIG. 2 is a schematic illustration of a plurality of terminal units which are linked to each other in a network structure based on recipient related registers associated with each terminal unit.

In FIG. 2 it is shown a schematic illustration of a plurality of users with terminal units which are linked to each other in a network structure based on recipient related registers associated with each terminal unit. A first user 100 may be connect to a level 1 user 101, which is connected to a level 2 user 102, which is connected to a level 3 user 103, etc. Hence, the number of potential users which are linked to the first user 100 forms a node network, wherein each user forms node connecting additional users to first user 100.

The illustrated network structure in FIG. 2 illustrates how an alarm message may be relayed and how the recipient related registers associated with terminal units, controlled by the users, provide connections between different users in different levels L1, L2, L3, etc. In particular, L5 user 105 is connected to the first user 100 via two different routes which indicates how the network structure utilized by the method and system for sending an alarm is robust and fail-safe since alternative routes for relaying an alarm to suitable users is provided.

Figure 3A:
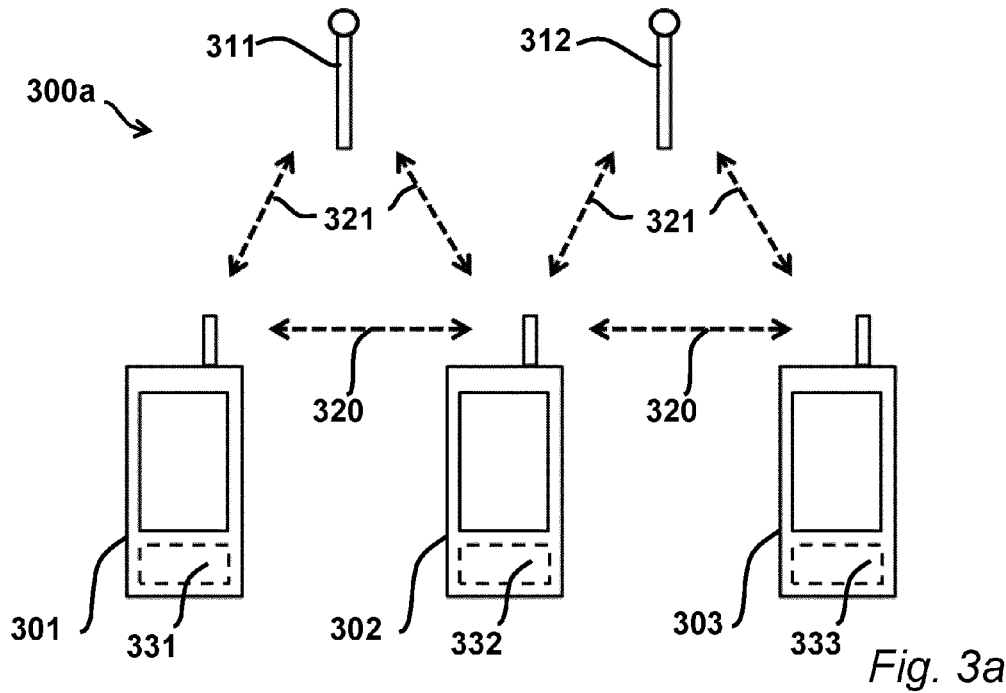
FIGS. 3a-b are schematic illustrations of systems for sending an alarm according to embodiments of the present invention.

FIG. 3a is a schematic illustration of a system 300a for sending an alarm according to an embodiment of the present invention. As illustrated, an alarm may be generated and sent from a first terminal unit 301 to a second terminal unit 302 directly, as indicated by arrows 320, or via a remote server device 311 as indicated by arrows 321. The remote server device may be configured for relaying an alarm between the terminal units, and to store information associated with the terminal units 301, 302, 303, such as terminal unit identification information and the recipient related registers associate with the respective terminal units. The recipient related registers related to each of the terminal units 301, 302, and 303, may also be stored locally in accessible memory devices 331, 332, 333 arranged in each terminal unit. The coordinate information associated with each of the terminal units 301, 302, 303 may further be communicated between the terminal units and the server devices 311.

Figure 3B:
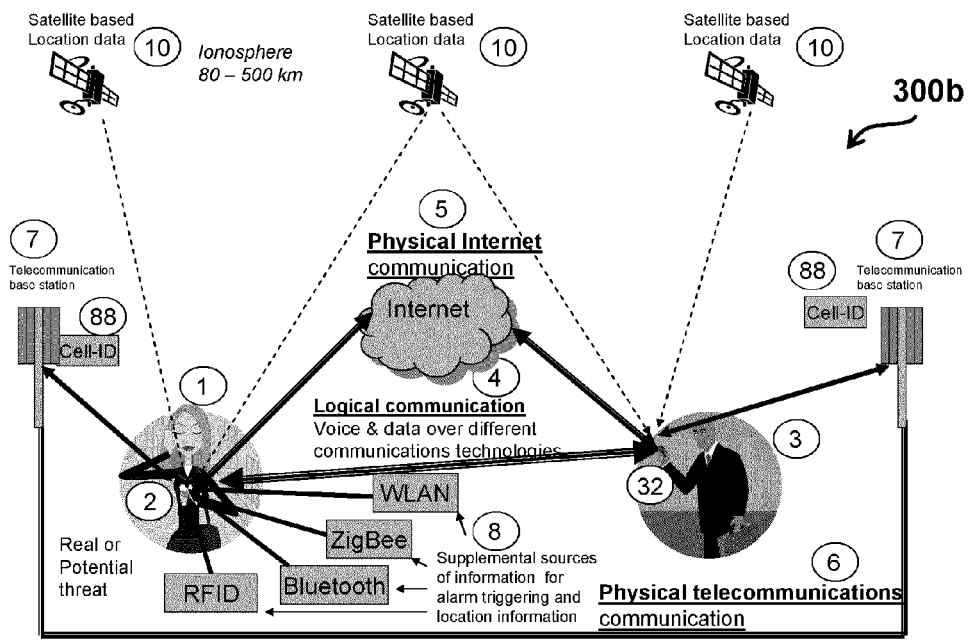

FIG. 3b illustrates a partial system 300b for sending an alarm comprising a user 1 who is experiencing e.g. a real or potential threat. The user may send an alarm via her terminal unit 2, in this case a mobile device, to a second user 3 operating a second terminal unit 32. The sent alarm may be contain additional information such as coordinate information based on information retrieved from satellites 10, or telecommunication base stations 7 indicating cell-id 88. The first terminal unit may also collect additional information from supplemental sources of information 8, such as WLAN; Zig- Bee, Bluetooth, RFID, etc, which additional information may be encoded into the alarm code of the alarm by the first terminal unit 2. For example, the communication between the first 2 and second 32 terminal units may transferred via wireless, or physical means, or internet connections 5.

Furthermore, the recipient related register associated with each one of the different users and terminal units forms a network of a plurality of users and terminal units, may be stored electronically in a e.g. a non-volatile memory device in each terminal unit, or it may be stored remotely in a central server system. Hence, in order to retrieve contact information of suitable contacts from the register, the terminal unit may access its memory device, or the contact information may be retrieved remotely from, or by, the server device.

The communication between terminal units, or between terminal units and remote server devices may for example be implemented by using mobile or non-mobile communication protocols, IP based protocols, and combinations of these and further protocols. Communication may also be implemented via wireless and/or wire-based electromagnetic based signals between terminal units or between mobile terminal units.

Moreover, the contact registers associated with each of the first and second terminal unit comprises a predefined list of contacts, also referred to as level 1 and level 2 users, may be selected and/or managed by the user of the first and second terminal units, respectively. Thereby the contact register defines a social network of contacts associated with the user of a terminal unit. For example, the level 1 users, or contacts, include a group of users/individuals, such as friends, family member, or professionals, or any other users selected by the user of the first terminal units. Accordingly, an alarm may be routed to level 2 users which are unknown, or undetermined, by the user of the first terminal unit. However, all potential level 2 users which may receive the alarm and an alarm notification are linked to the user of the first terminal unit via the contact register of the second terminal.

The coordinate information representative of a location of the terminal units may be achieved by utilizing different location technologies. The terminal units may be provided with location receiving equipment capable of determining coordinate information, such as longitude and latitude coordinates, or other coordinate information representative of the location of the a terminal unit. Available location technologies which may be utilized includes, but are not limited to, GPS, i.e. satellite based location information techniques, GNSS Service, US NAVSTAR, Assisted GPS; GLONASS; GALILEO. Hence, the terminal unit may comprise GPS receiver, or antenna, used for retrieving and processing location information.

The terminal units may further employ different radio based technologies for acquiring location information, for example telecommunication system, such as IP based, or GSM, 3G, 4G based, Bluetooth, ZigBee, WLAN, passive and active RFID; cell and network identification codes and coordinates, wherein the location may be received via communication using suitable communication protocols.

The alarm may further be intelligently, and autonomously, i.e. independent from the first terminal unit, routed to level 2 contacts which are linked to the first terminal unit via the contact register of the second terminal unit. Thereby, a social link between the user and level 2 users is achieved which provides improved certainty for the user sending an alarm that potential receivers of the alarm are reliable and eligible.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for sending an alarm, comprising:
generating an alarm code in a first terminal unit, the alarm code comprising at least coordinate information representative of a location of the first terminal unit;
sending an alarm comprising the alarm code from the first terminal unit to a second terminal unit, which second terminal unit is determined by a first contact register associated with the first terminal unit; and
receiving the alarm in the second terminal unit,
wherein the alarm is provided to a third terminal unit, the third terminal unit being determined by a second contact register associated with the second terminal unit, and
wherein the alarm is provided to a fourth terminal unit for activating an alarm indication in the fourth terminal unit if the fourth terminal unit is located within a predetermined distance from the first terminal unit, the fourth terminal unit being determined by a third contact register associated with the third terminal unit.

2. The method according to claim 1, wherein the predetermined distance is based on a predetermined geographical region.

3. The method according to claim 1, wherein the alarm code further comprises at least one alarm identification parameter.

4. The method according to claim 1, wherein providing the alarm to the third terminal unit comprises:
sending the alarm from the second terminal unit, and
receiving the alarm in the third terminal unit.

5. The method according to claim 1, wherein the alarm is sent directly between the first and second terminal units, and/or between the second and third terminal units.

6. The method according to claim 1, wherein the alarm is send via at least one remote server, which remote server forwards the alarm between the first and second terminal units, and/or between the second and third terminal units.

7. The method according to claim 1, further comprising:
determining if the third terminal unit is located within the predetermined distance from the first terminal unit by comparing the coordinate information representative of the location of the first terminal unit with coordinate information representative of a location of the third terminal unit.

8. The method according to claim 1, further comprising:
generating reply code in the third terminal unit, the reply code comprising coordinate information representative of a location of the at least one third terminal unit; and
providing a reply comprising the reply code to the first terminal unit.

9. The method according to claim 1, wherein the alarm is provided to the third terminal unit for activating an alarm indication in the third terminal unit after a predetermined time period from the sending of the alarm from the first terminal unit.

10. A non-transitory computer readable medium on which a computer program for causing a server to apply the method of claim 6 is stored.

11. A system for sending an alarm, the system comprising:
a first terminal unit adapted to generate an alarm code comprising at least coordinate information representative of a location of the first terminal unit and to transmit an alarm comprising the alarm code;
a second terminal unit adapted to receive the alarm, which second terminal unit is determined by a register representative of contact information associated with the first terminal unit,
wherein the second terminal unit is adapted to provide the alarm to a third terminal unit being determined by a second contact register associated with the second terminal unit,
wherein the third terminal unit is adapted to provide the alarm to a fourth terminal unit for activating an alarm indication in the fourth terminal unit if the fourth terminal unit is located within a predetermined distance from the first terminal unit, the fourth terminal unit being determined by a third contact register associated with the third terminal unit.

12. The system according to claim 11, wherein the third terminal unit is adapted to generate a reply code comprising coordinate information representative of a location of the third terminal unit, and the third terminal unit is further adapted to provide a reply comprising the reply code to the first terminal unit.

13. The system according to claim 11, further comprising a server adapted to provide an alarm, wherein the server is configured to:
acquire an alarm code generated in a first terminal unit, the alarm code comprising at least coordinate information representative of a location of the first terminal unit;
provide the alarm comprising the alarm code to a second terminal unit, which second terminal unit is determined by a first contact register associated with the first terminal unit;
forward the alarm to a third terminal unit for activating an alarm indication in the third terminal unit if the third terminal unit is located within a predetermined distance from the first terminal unit, the third terminal unit being determined by a second contact register associated with the second terminal unit.

\* \* \* \* \*